Jan. 19, 1937.  J. F. SULLIVAN  2,068,390
INDICATOR FOR WEIGHING SCALES
Filed April 5, 1934
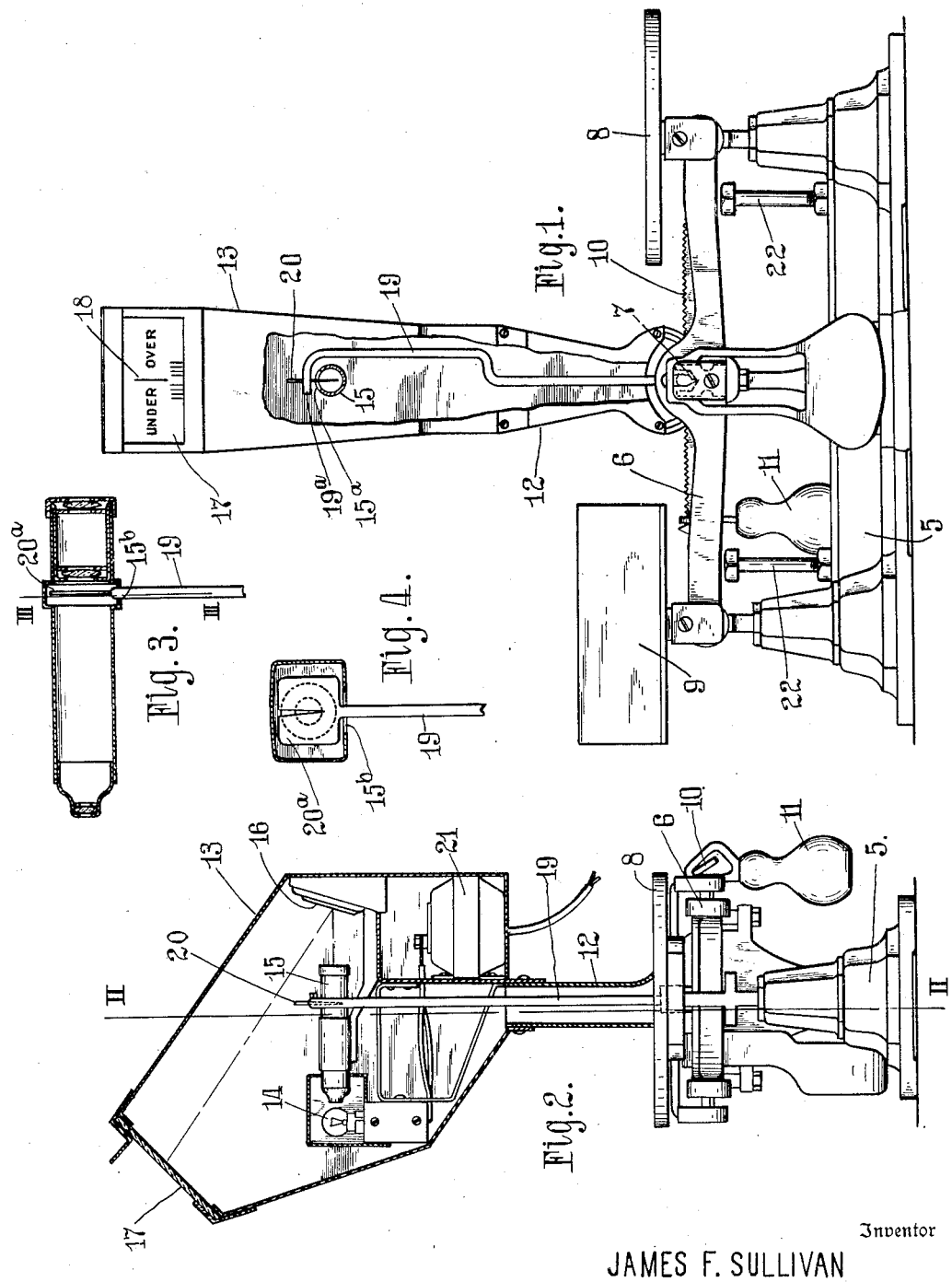
Inventor
JAMES F. SULLIVAN
By Finckel & Finckel
Attorneys Patented Jan. 19, 1937

2,068,390

UNITED STATES PATENT OFFICE 2,068,390

INDICATOR FOR WEIGHING SCALES

James F. Sullivan, Columbus, Ohio

Application April 5, 1934, Serial No. 719,154

7 Claims. (Cl. 265—59)

This invention relates to weighing devices and particularly to such as are used in merchandising.

One object of the invention is to provide a scale in which sensitivity, speed and accuracy of the weighing operation are promoted, these results being in the main effected by improvements in the indicating mechanism. A further object is to reduce the wear on the bearings by effecting a reduction of the oscillations of the scale beam. Other objects and improved results will appear to those skilled in the art from the construction and mode of operation herein set forth.

The invention is embodied in the example herein shown and described, the features of novelty being finally claimed.

In the accompanying drawing—

Figure 1 is a view of the front or dealer's side of the scale with parts broken out and parts in section of a scale according to my invention.

Fig. 2 is a view partly in elevation and partly in section, the latter being on the line II—II Fig. 1.

Fig. 3 is a longitudinal section on an enlarged scale of a modified magnifier containing a modified pointer means.

Fig. 4 is a cross section on the line III—III Fig. 3.

In the views the character 5 designates the base or supporting frame and 6 the scale main beam, said beam being pivoted in the middle, as usual, on knife edges at 7 and having pivotally connected at the opposite ends thereof the usual pans or platters 8 and 9—one for the removable weight and the other for the merchandise to be weighed. At the rear, or customer's side of the scale, is the usual serrated bar 10 rocking with the main beam 6, having thereon a movable poise 11 for weighing fractions of a pound or other unit of weight.

Secured to the upper end of the hollow column 12 that extends rigidly upward from the middle of the supporting base or frame is a hood or housing 13. In said housing 13 is suitably mounted an electrical lamp 14 arranged to send its beams through one end of a horizontally mounted microscope tube 15 to a reflector 16 arranged and mounted within the housing 13 opposite the other end of said tube. The reflector 16 can be either flat or concave and is arranged at an angle or suitably focused to cast the reflected light upon a suitable screen or translucent pane of glass 17 secured in a suitable framing at the front side of the hood or housing so as to be visible to the operator. In the vertical plane of the fulcrum of the scale beam and at the middle of the glass pane 17 is a mark 18, at opposite sides of which is painted or otherwise made to appear the words "Under" and "Over". There can also be added flanking the middle mark 18 indicia of the value of the overweight or underweight and/or the range of tolerance from the exact weight.

Secured to the middle of the scale beam is an upwardly extending rod 19 having its upper end bent to extend as a short arm 19ª in which is fixed an opaque pin or pointer member 20 extending downward through a slot 15ª in the upper side of the tube 15 so that when the rod 19 is oscillated by the oscillation of the scale beam said pin swings transversely within the tube. The pin 20 is arranged in the arm 19ª so that when the main beam 6 is in a balanced or horizontal position, said pin or pointer is in the vertical plane of the mark 18.

Mounted in said hood or housing 13 is an ordinary electrical transformer 21 adapted to step down a current of electricity for energizing the lamp if the illuminating current is taken from a street or other too powerful current.

Instead of using an opaque pin pointer 20 for projecting a shadow on the screen there can be employed, as shown in Figs. 3 and 4, a disk-like plate 20ª of opaque material provided with a narrow slit forming the pointer member said plate 20ª being secured to the upper end of the rod 19 unbent and oscillated thereby within the tube of the microscope. The tube of the microscope in such example can be enlarged in the transverse plane where the plate 20ª oscillates and such tube is provided with a slot 15ᵇ at its lower side where the rod 19 extends therethrough to permit oscillation of said rod 19 in the manner before described.

Where the pointer of light is projected as by the means indicated in Fig. 3 the screen may be modified, as well understood, to best display such illuminated pointer.

In some instances where a weighing apparatus is installed in a room the screen at 17 can be omitted and a wall of the room or a screen hung on a wall of or other object in the room used as a screen there being added, of course, to such wall or other screen a marker to coöperate with the scale pointer to indicate the balanced position of the beam.

Except as to the operation and result of the use of the indicator the weighing operation is the same as that practiced with the common scale.

That is to say the main scale beam is brought to balanced position by adding to or taking from the merchandise or the adjustment of the movable poise as required by the overweight or underweight sign until the image of the pointer member cast by the reflector coincides with the mark on the screen.

Owing to the fact that the pointer carrying rod is secured to the beam in the vertical axis thereof to extend a great distance above the axis of the main scale beam it is apparent that any slight movement of said beam will cause a greatly magnified movement of the pointer, and that as a consequence of this magnified movement the swing of the main beam can be much reduced as compared with that taking place in the usual weighing scale. I have therefore shown in such an ordinary scale two threaded bolts 22, 22, or stops installed in the base—one at each side of the middle fulcrum of the beam, and directly below the beam, to arrest the beam and limit its movements to a relatively small degree. A result of this feature is that wear of all the bearings is greatly reduced, and notwithstanding the movements of the main scale beam are minimized the movements of the reflected pointer are magnified and great accuracy and speed in the weighing operation are promoted. This saves time and insures justice in the transaction between the purchaser and dealer.

The forms of the parts can be changed without departing from the gist of the invention as claimed.

What I claim is:

1. In a counter weighing scale, the combination of a support, a scale beam fulcrumed thereon, a commodity platter mounted on one end of said scale beam, a weight receiving platter mounted on the other end of said scale beam, a housing mounted on said support and extending outwardly therefrom, said housing having an opening in one of its walls, a translucent screen arranged in said opening and provided with stationary weight indicia arranged radially of the fulcrum of said scale beam, a tubular member disposed in said housing, a plurality of lenses arranged in said tubular member, said tubular member being provided with a lateral opening intermediate its ends, an oscillatable arm fixed to said beam and extending therefrom into said housing, a pointer fixed to the outer end of said arm and disposed radially of the fulcrum of said scale beam and extending through said lateral opening into said tubular member, and a source of light arranged adjacent to one end of said tubular member whereby the rays of light and the image of said pointer are projected by said lenses onto said screen, said arm and said pointer being movable by said scale beam.

2. In a counter weighing scale, the combination of a support, a scale beam fulcrumed thereon, a commodity platter mounted on one end of said scale beam, a weight receiving platter mounted on the other end of said scale beam, a hollow post fixed to and extending outwardly from said support radially of the fulcrum of said scale beam, a housing fixed on said hollow post, said housing having an opening in one of its walls, a translucent screen arranged in said opening, a tubular member arranged in said housing, a system of lenses in said tubular member, said tubular member being provided intermediate its ends with a transverse slot, an arm fixed to said scale beam and extending through said post into said housing and having oscillatable movement about the fulcrum of said scale beam and at right angle to the optical axis of said system of lenses, a pointer fixed to said arm and extending through said slot into said tubular member radially of said scale beam fulcrum, and a source of light arranged adjacent to one end of said tubular member whereby the image of said pointer is projected onto said screen to indicate in an enlarged form the weighing movement of said scale beam.

3. In a counter weighing scale, the combination of a support, a scale beam fulcrumed on said support, a commodity platter mounted on one end of said scale beam, a weight receiving platter mounted on the other end of said scale beam, a hollow post fixed to said support adjacent to the fulcrum of said scale beam and extending outwardly and radially thereof, a housing fixed to the upper end of said post, a translucent screen arranged in one of the walls of said housing, an oscillatable arm fixed to said scale beam adjacent to and radially of the fulcrum, said scale beam extending through said post into said housing, a tubular member arranged in said housing, said tubular member being provided intermediate its ends with a transverse slot, a system of lenses arranged in said tubular member, and indicating means disposed in said tubular member and extending outwardly therefrom through said slot and fixed to the upper end of said oscillatable arm whereby said indicating means traverses at right angle the optical axis of said system of lenses in accordance with the movement of said scale beam, and a source of light arranged adjacent to one end of said tubular member for projecting the image of said indicating means onto said screen.

4. An even-balance counter scale comprising in combination a support, a commodity platter mounted on one end of said scale beam, a weight receiving platter mounted on the other end of said scale beam, a scale beam fulcrumed on said support, a housing fixed to said support, a translucent screen arranged in one of the walls of said housing and provided with a stationary weight indicia disposed radially of the fulcrum of said scale beam, an oscillatable arm fixed to said scale beam and extending radially of the fulcrum thereof into said housing, a tubular member fixed horizontally in said housing and provided at its upper portion intermediate its ends with a transverse slot, a system of lenses arranged in said tubular member, a source of light arranged adjacent to one end of said tubular member, and a pointer mounted in the outer end of said arm radially of the fulcrum of said scale beam and extending downwardly through said slot into said tubular member whereby said pointer is movable transversely of the optical axis of said system of lenses in accordance with the weighing movement of said scale beam and the image of said pointer is projected onto said screen in correlation with said weight indicia.

5. An even-balance counter scale comprising in combination a support, a scale beam fulcrumed on said support, a housing fixed to said support and extending vertically therefrom and radially of the fulcrum of the scale beam, a translucent screen arranged in one of the walls of said housing and provided with a stationary weight indicia, an oscillatable arm fixed to said scale beam and extending therefrom upwardly and radially into said housing, a tubular member fixed in said housing and provided intermediate its ends with a transverse slot, a system of lenses arranged in said tubular member, a source of light arranged adjacent to one end of said tubular member, and a radially disposed pointer adjustably mounted in the outer end of said arm and extending through said slot into said tubular member whereby said pointer is movable transversely of the optical axis of said system of lenses in accordance with the weighing movement of said scale beam and the image of said pointer is projected onto said screen in correlation with said weight indicia.

6. In a counter weighing scale of the character described, the combination of a stationary support, a scale beam fulcrumed thereon, a commodity platter carried by one end of said scale beam, a weight receiving platter carried by the other end thereof, a housing fixed to said support adjacent to the fulcrum of said scale beam and extending outwardly and radially of said fulcrum, a translucent screen arranged in one of the walls of said housing, a stationary weight indicia arranged on said screen radially of said fulcrum, a tubular member horizontally disposed in said housing and provided with a transverse slot, a source of light arranged near one end of said tubular member, projecting lenses arranged in the other end of said tubular member, an oscillatable arm fixed to said scale beam and extending therefrom into said housing radially of the fulcrum thereof, and a weight indicia selecting means fixed to the upper end of said arm and extending through said slot into said tubular member whereby the movement of said weight indicia selecting means is projected onto said screen adjacent to said stationary weight indicia.

7. In a counter weighing scale of the character described, the combination of a stationary support, a scale beam fulcrumed thereon, a housing fixed to said support and extending outwardly and radially of the fulcrum of said scale beam, a translucent screen arranged in one of the walls of said housing, stationary weight indicia arranged on said screen, a tubular member horizontally disposed in said housing, a source of light arranged adjacent to one end thereof, projecting lenses arranged in the other end thereof, an enlargement formed in said tubular member intermediate its ends, the bottom wall of said enlargement being formed with a transverse slot, an oscillatable member fixed to said scale beam and extending therefrom radially of the fulcrum thereof, a shutter fixed to the upper end of said oscillatable arm and extending through said slot into said enlargement to interrupt the passage of light to said projecting lenses, the area of said shutter being greater than the inside opening of said tubular member, said shutter being provided with a slit arranged radially of the fulcrum of said scale beam, whereby a beam of light is permitted to pass through said slit and be projected onto said scale in correlation with said weight indicia.

JAMES F. SULLIVAN.